United States Patent

Schmidt et al.

[11] Patent Number: 5,840,145
[45] Date of Patent: Nov. 24, 1998

[54] METHOD FOR REINFORCING A FLEXIBLE SHEET

[75] Inventors: Noel Schmidt, Palo Alto; Cliff Gyotoku; David Albertalli, both of San Jose, all of Calif.

[73] Assignee: Raster Graphics, Inc., San Jose, Calif.

[21] Appl. No.: 815,129

[22] Filed: Mar. 12, 1997

[51] Int. Cl.$^6$ .................................................. B25B 11/00
[52] U.S. Cl. ........................ 156/272.4; 156/297; 269/8; 29/419.2; 346/104; 346/134; 347/37; 347/104
[58] Field of Search ............................... 269/8; 346/104, 346/134; 347/37, 104; 29/DIG. 25, 419.2, 890.1; 248/683, 205.3, 220.22; 156/272.4, 285, 297, 196

[56] References Cited

U.S. PATENT DOCUMENTS

| | | | |
|---|---|---|---|
| 2,713,379 | 7/1955 | Sisson | 269/8 |
| 4,463,361 | 7/1984 | Koumura et al. | 346/134 |
| 5,124,728 | 6/1992 | Denda | 346/134 |
| 5,195,836 | 3/1993 | Longust et al. | 347/37 |

*Primary Examiner*—Steven D. Maki
*Assistant Examiner*—Michael A. Tolin
*Attorney, Agent, or Firm*—Burns, Doane, Swecker and Mathis LLP

[57] ABSTRACT

In a method for reinforcing a flexible sheet such that the flexible sheet will retain desired topographical features, a flexible sheet is positioned on a surface of a magnetic chuck. The surface of the magnetic chuck has a topography, such as a perfectly flat topography, such that a magnetic force of the magnetic chuck causes a first surface of the flexible sheet to be formed into a reverse topography of the topography of the magnetic chuck. A frame having greater rigidity than the flexible sheet is secured relative to the flexible sheet as the first surface of the flexible sheet is formed into the reverse topography of the topography of the magnetic chuck by the magnetic force of the magnetic chuck. The flexible sheet together with the frame secured thereto are removed from the magnetic chuck. The first surface of the flexible sheet retains the reverse topography of the topography of the magnetic chuck when the flexible sheet is removed from the magnetic chuck together with the frame secured thereto.

16 Claims, 3 Drawing Sheets

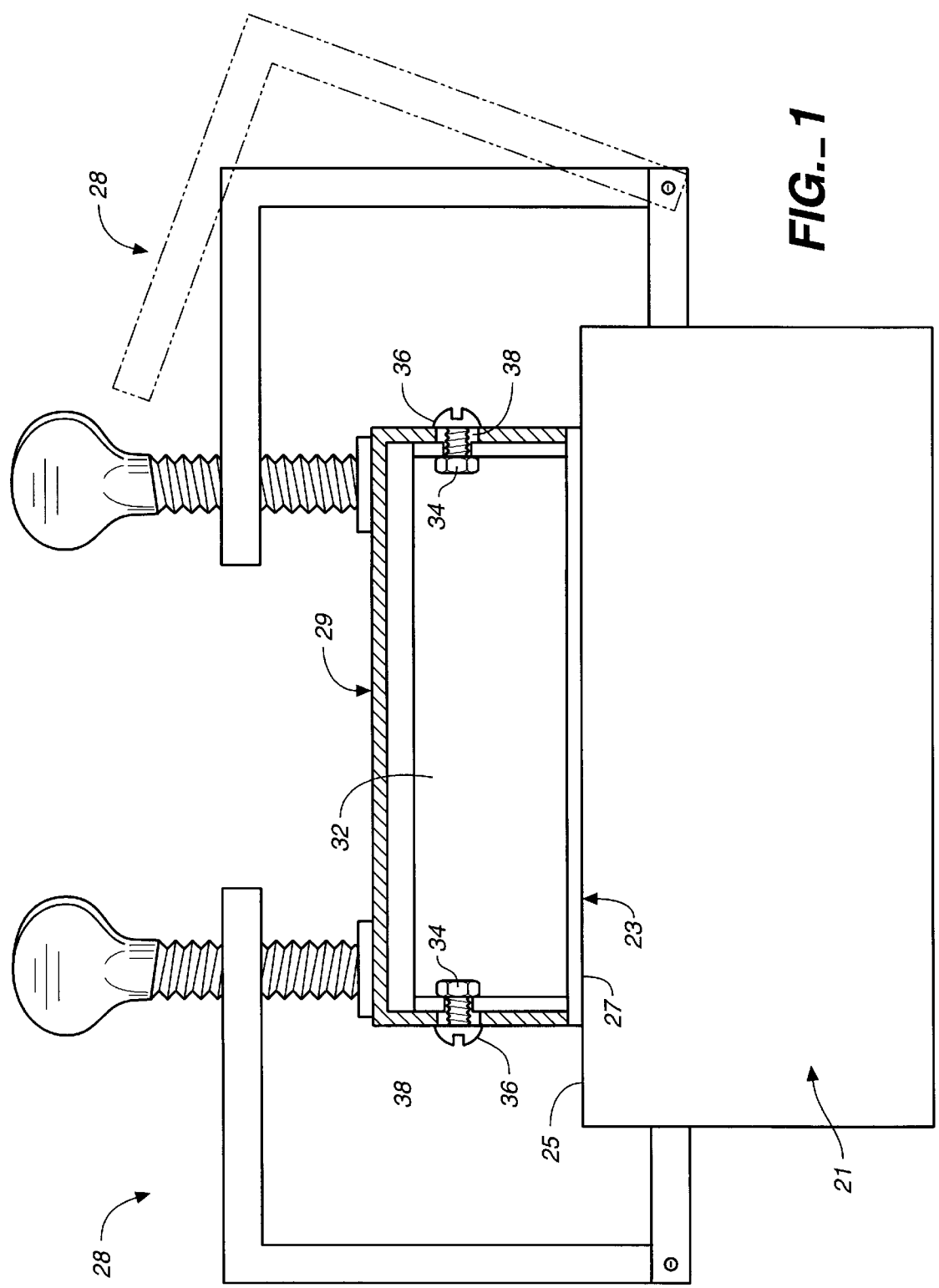

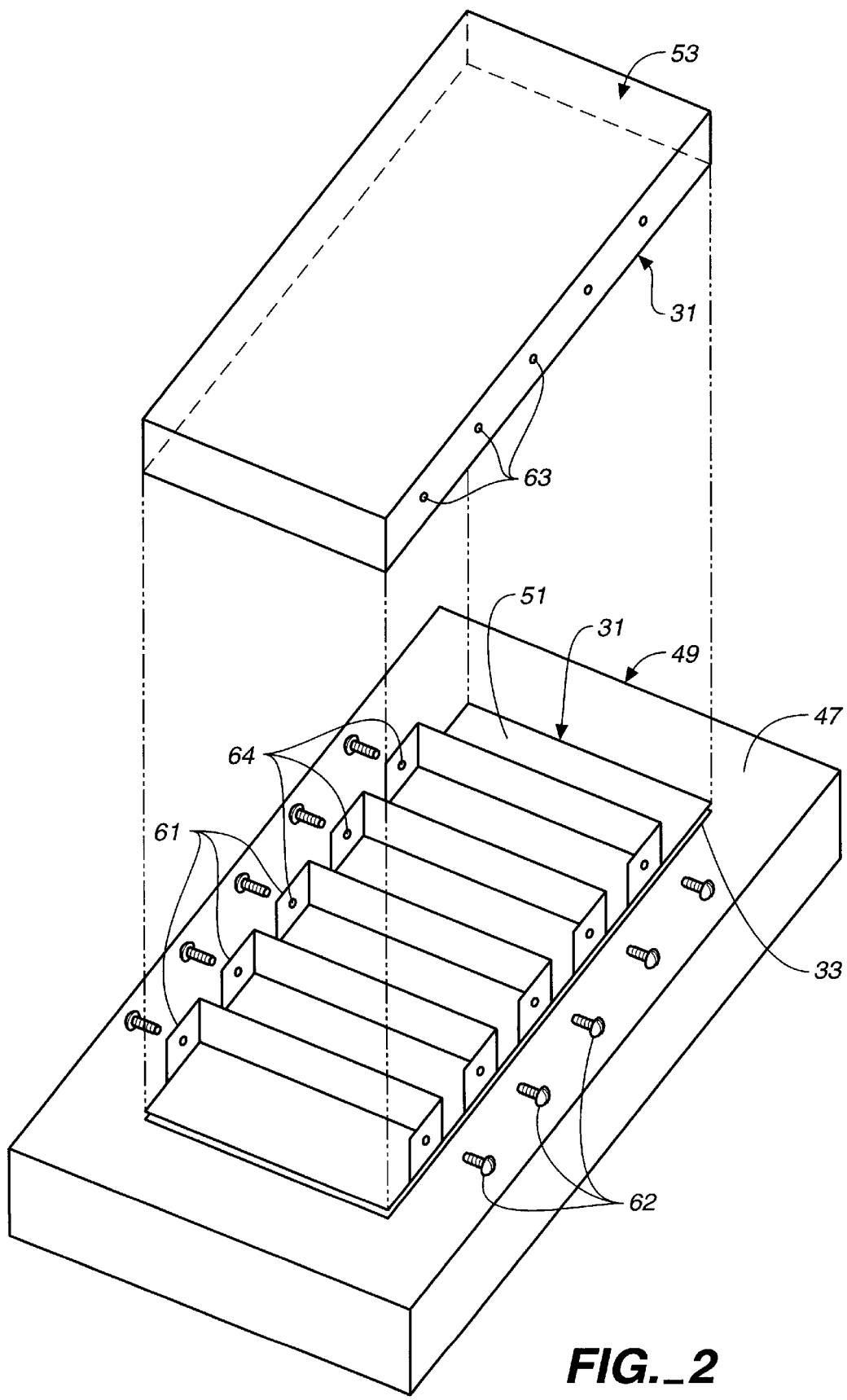
FIG._2

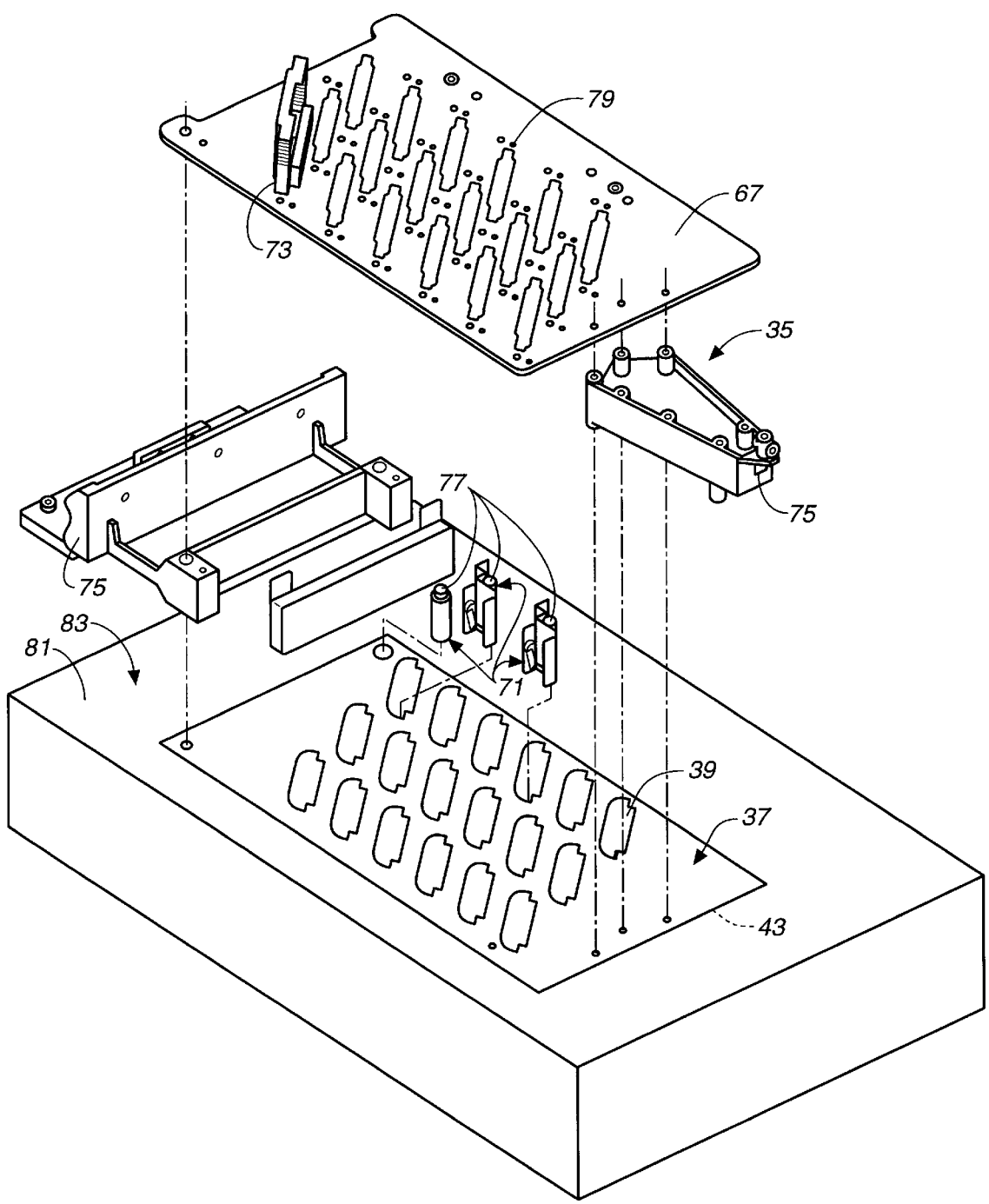
FIG._3

METHOD FOR REINFORCING A FLEXIBLE SHEET

BACKGROUND OF THE INVENTION

1. Field of the Invention

The present invention relates to a method for reinforcing a flexible sheet in such a manner that the flexible sheet will retain a desired surface topography.

2. Background and Summary of the Invention

For various purposes, it is desirable to make large surfaces having particular topographies. For example, certain ink jet printer apparatuses require large flat surfaces over which a vacuum can be drawn, and large flat surfaces to which ink jet printer heads can be attached. The vacuum surface, hereinafter referred to as a vacuum platen, is in the form of a rectangular box, one surface of the box having numerous perforations therein. Because a printing operation must be performed on the perforated surface, it must be extremely flat. Conventional manufacturing techniques necessary to attain the desired flatness require extremely precisely formed parts, which can be quite expensive. Further, unless perforations are formed in a relatively thin sheet of material, it is difficult to form the perforations. However, thin sheets of material do not have the requisite stiffness necessary and may tend to flex. It is desirable to provide an inexpensive method for reinforcing flexible sheets of material in such a manner that they retain desired topographical characteristics, such as flatness.

In such ink jet printer apparatuses, it is desirable to provide a carriage assembly on which a plurality of printer heads can be mounted. The carriage assembly must have a plurality of holes for receiving the printer heads so that nozzle surfaces of the printer heads can be mounted flush with an outer surface of the carriage assembly and print on a web of paper positioned at a precise distance from the carriage on the vacuum platen. Flatness is a desirable characteristic of the outer surface of the carriage assembly because the printer heads must be a precise distance from the vacuum platen. It is desirable to make the carriage assembly from inexpensive parts, however, they do not tend to have the necessary rigidity to carry the loads of the printer heads and to be subjected to the conditions to which the carriage assembly will be subjected.

The method according to the present invention, generally speaking, provides a technique for reinforcing relatively flexible sheets of inexpensive material so that they can retain desired surface topographies. In one embodiment, the method permits manufacture of a vacuum platen and, in another embodiment, the method permits manufacture of a printer head carriage from relatively inexpensive parts.

In accordance with one aspect of the present invention, a method for reinforcing a flexible sheet is disclosed. According to the method, a flexible sheet is positioned on a surface of a magnetic chuck, the surface of the magnetic chuck having a topography, such that a magnetic force of the magnetic chuck causes a first surface of the flexible sheet to be formed into a reverse topography of the topography of the magnetic chuck. A frame having greater rigidity than the flexible sheet is secured relative to the flexible sheet as the first surface of the flexible sheet is formed into the reverse topography of the topography of the magnetic chuck by the magnetic force of the magnetic chuck. The flexible sheet together with the frame secured thereto are removed from the magnetic chuck. The first surface of the flexible sheet retains the reverse topography of the topography of the magnetic chuck when the flexible sheet is removed from the magnetic chuck together with the frame secured thereto.

In accordance with another aspect of the present invention, a method of reinforcing a flexible sheet is disclosed. According to the method, a flexible sheet is positioned on a surface of a magnetic chuck, the surface of the magnetic chuck having a topography, such that a magnetic force of the magnetic chuck causes a first surface of the flexible sheet to be formed into a reverse topography of the topography of the magnetic chuck. Ribs are attached to the flexible sheet as it is formed into the reverse topography of the topography of the magnetic chuck. A frame is secured relative to the flexible sheet by attaching the frame to the ribs as the first surface of the flexible sheet is formed into the reverse topography of the topography of the magnetic chuck. The flexible sheet together with the frame secured thereto are removed from the magnetic chuck. The first surface of the flexible sheet retains the reverse topography of the topography of the magnetic chuck when the flexible sheet is removed from the magnetic chuck together with the frame secured thereto.

In accordance with still another aspect of the present invention, a method of reinforcing a flexible sheet is disclosed. According to the method, a plurality of spacer elements are loosely attached to a first flexible sheet having a plurality of holes therein, all of the spacer elements being of the same size. A second flexible sheet is loosely attached to the plurality of spacer elements. The first and second flexible sheets loosely attached to the plurality of spacer elements are positioned on a surface of a magnetic chuck such that an outer surface of the first flexible sheet is adjacent the surface of the magnetic chuck, the surface of the magnetic chuck having a topography, and such that a magnetic force of the magnetic chuck causes the outer surface of the first flexible sheet to be formed into a reverse topography of the topography of the magnetic chuck. The plurality of spacer elements and the first and second flexible sheets are tightly attached to form a resulting assembly. The resulting assembly is removed from the magnetic chuck. The outer surface of the first flexible sheet retains the reverse topography of the topography of the magnetic chuck when the tightened assembly is removed from the magnetic chuck.

BRIEF DESCRIPTION OF THE DRAWINGS

The features and advantages of the present invention are well understood by reading the following detailed description in conjunction with the drawings in which like numerals indicate similar elements and in which:

FIG. 1 schematically shows a cross-sectional view of a magnetic chuck for reinforcing a flexible sheet according to an embodiment of the present invention;

FIG. 2 schematically shows a partially broken, top perspective view of a magnetic chuck for reinforcing a flexible sheet according to an embodiment of the present invention; and FIG. 3 schematically shows a partially broken, top perspective view of a magnetic chuck for reinforcing a flexible sheet according to an embodiment of the present invention.

DETAILED DESCRIPTION

A magnetic chuck 21 is shown in FIG. 1. The magnetic chuck 21 is used in a method of the present invention for reinforcing a flexible sheet 23 attractable by the chuck such that the flexible sheet will retain desired topographical features. Herein, the term flexible is used in the sense of not necessarily having desired strength characteristics for the purposes for which it is intended to be used and, in fact, can include what would by many standards be quite rigid.

The flexible sheet 23 is positioned on a surface 25 of the chuck 21. The surface 25 of the chuck 23 has a topography, such as flat, curved, sinusoidal, or some other shape. The chuck 21 is preferably a large electromagnet. When power is applied to the chuck 21, a magnetic force of the chuck causes a first surface 27 of the flexible sheet 23 to be formed into a reverse topography of the topography of the chuck. When the sheet 23 is a relatively thin, e.g., approximately 1/16 thick, steel or similar sheet, a magnetic force applied by the chuck 21 preferably has the effect of the application of approximately 500 psi pressure on the sheet. For thicker or thinner sheets, more or less magnetic force can be used as necessary. The chuck 21 can be provided with clamps 28, which may be pivotable relative to the chuck, for securing items to be fastened together on the chuck in position relative to one another.

While the flexible sheet 23 is formed into the reverse topography of the topography of the chuck 21 by the magnetic force of the chuck, one or more ribs 32 are preferably secured to the sheet, such as by an adhesive. A frame 29, which preferably has greater rigidity than the flexible sheet, is secured relative to the flexible sheet, preferably by being secured to the ribs 32. The frame 29 can be formed from one or more structural members having widely varying tolerances, and is preferably attached to the flexible sheet 23 by suitable fasteners such as nuts, bolts, screws, or adhesives, as well as with shimming devices as necessary, such as washers, gaskets and the like, to ensure that the flexible sheet is secured to the rigid frame at all necessary points. While on the chuck 21, the frame 29 is further rigidified by being secured to the ribs 32, so that the resulting structure is substantially more rigid than the flexible sheet 23. The ribs 32 preferably have self-clinching nuts 34 attached to flanges of the ribs for receiving bolts or screws 36 that extend through elongated holes 38 in the frame 29. The elongated holes 38 compensate for deviations in the shape of the frame 29 relative to the shape of the flexible sheet 23 when it is held to the chuck. After the power to the chuck 21 is turned off, when the flexible sheet 23 is removed from the chuck with the frame 29 secured to the sheet in this manner, the first surface of the flexible sheet retains the reverse topography of the topography of the chuck.

The method of the present invention is particularly useful in making certain precision items, from relatively inexpensive materials, that are used in an ink jet printer apparatus. One such item is a vacuum platen 31 (FIG. 2) having a perforated surface made from a perforated flexible sheet 33 that is extremely flat. In use, a paper web is held against the perforated sheet 33 by a vacuum and a carriage carrying numerous precision mounted ink jet printer heads is moved past the paper. The perforated sheet 33 must be extremely flat to ensure that the entire surface of the paper is at a precise distance from the printer heads. The perforated sheet 33 is preferably made from a flexible sheet of steel.

Another item preferably manufactured using the method of the present invention is the printer carriage 35 (FIG. 3) used in the ink jet printer. The printer carriage 35 includes a flexible sheet 37 in which numerous holes 39 are precision formed by a suitable method, such as laser cutting. The sheet 37 is reinforced according to the method of the invention. In use, ink jet printer head assemblies are removably mounted on the printer carriage 35 such that nozzle surfaces of the printer heads are flush with an outer surface 43 of the sheet. Flatness of the outer surface 43 is important to ensure that, when the nozzle surfaces of the printer heads are flush with the outer surface, the nozzle surfaces are at a precise distance from the paper web that is held flat against the vacuum platen. The vacuum platen 31 and the printer head carriage 35 are disclosed further in commonly-assigned U.S. patent application Ser. No. 08/815,132 (Attorney Docket No. 031228-001), entitled Ink Supply Apparatus, U.S. patent application Ser. No. 08/815,133 (Attorney Docket No. 031228-002), entitled Apparatus and Method for Intermittently Advancing a Web, and U.S. patent application Ser. No. 08/815,590 (Attorney Docket No. 031228-003), entitled Printer Head Carriage and Method for Aligning Printer Heads on a Printer Head Carriage, which are incorporated by reference.

As seen in FIG. 2, the vacuum platen 31 is preferably made by positioning a first flexible perforated sheet 33 on a flat surface 47 of a chuck 49. When power is applied to the chuck, the sheet 33 is drawn against the flat surface 47 of the chuck 49. A second perforated sheet 51 having larger holes may be positioned over the first sheet 33 to provide greater rigidity to unsecured portions of the first sheet and to assist in ensuring uniform air flow in use.

Ribs 61 are preferably secured to the flexible sheets, such as by an adhesive, as the first surface 55 of the first sheet 33 is formed into the reverse topography of the topography of the chuck 49. The ribs have flanges in which self-clinching nuts 64 are secured, such as by swaging.

A flexible, preferably box-shaped frame 53 that is substantially C-shaped in cross-section is secured relative to the sheets as the first surface 55 of the first sheet 33 is formed into the reverse topography of the topography of the chuck 49. The frame 53 may be formed from a single piece of material, preferably a bent metal that is attracted by the magnetic force of the chuck, and does not need to possess great precision in its dimensions. For example, it may be slightly twisted along its length or width.

The frame 53 is secured to the ribs 61 by bolts 62 extending through elongated bolt holes 63 formed in the, frame 53 and mating with the self-clinching nuts 64 on the flanges of the ribs. The elongated bolt holes 63 prevent imperfections in the dimensions of the frame 53 from affecting the final shape of the outer surface of the first sheet 33 because, once the ribs 61 are secured to the frame, the ribs permanently rigidify the frame and cause it to retain the first sheet in its flat condition caused by the magnetic force of the chuck 49. Thus, when the frame 53, rigidified by the ribs 61, is removed from the chuck 49 together with the flexible sheet 33 secured thereto the outer surface of the flexible sheet retains a flat shape.

The frame 53 is preferably assembled together with the first and second sheets 33 and 51 being attached to the ribs 61 with adhesive or bolts. After the chuck 49 is energized, the ribs 61 are attached to the first and second sheets 33 and 51 on the chuck 49, and the frame 53 is positioned relative to the ribs 61, the only assembly that needs to be performed is the tightening of the bolts 62 extending through the elongated bolt holes 63 to permanently rigidify the resulting structure.

The printer head carriage 35 preferably includes the flexible sheet 37, a plurality of identically-sized spacer elements, and a second flexible sheet 67. The spacer elements preferably include holder members 71 for printer head carriers 73, and portions of wheel assemblies 75 for riding on a track on a printer device. For purposes of illustration, only two holder members 71 are shown, although there are ordinarily twenty-four such holder members provided. The holder members 71 and wheel assembly portions 75 have the same thickness dimensions. The holder members 71 are preferably plastic parts having pins 77 at ends thereof for being received in holes 79 in at least one of the first and second sheets 37 and 67. The wheel assembly portions 75 are preferably secured relative to the first and second sheets 37 and 67 by bolts or screws.

As seen in FIG. 3, in making the printer head carriage, a plurality of spacer elements are loosely attached to the first flexible sheet 37. The second flexible sheet 67 is also loosely attached to the plurality of spacer elements 71. The first and second flexible sheets 37 and 67 that are loosely attached to the plurality of spacer elements are positioned on a surface 81 of a magnetic chuck 83 such that the outer surface 43 of the first flexible sheet is adjacent the surface of the magnetic chuck. The magnetic chuck 83 is preferably the same magnetic chuck as used in making the vacuum platen 31, and has a flat surface. Magnetic force of the magnetic chuck 83 causes the outer surface 43 of the first flexible sheet 37 to be formed into a reverse topography of the topography of the magnetic chuck, i.e., flat.

The loosely assembled first and second sheets 37 and 67 and spacer elements are on the surface 81 of the chuck 83 are then tightly attached by tightening connections or curing an adhesive on the parts. The resulting assembly is removed from the magnetic chuck. The second flexible sheet 67 reinforces the first flexible sheet 37.

It is, of course, possible to embody the invention in specific forms other than those described above without departing from the spirit of the present invention. The embodiments shown are merely illustrative and should not be considered restrictive in any way. The scope of the present invention is given in the appended claims, rather than the preceding description, and all variations and equivalents which fall within the range of the claims are intended to be embraced therein.

What is claimed is:

1. A method for reinforcing a flexible sheet, comprising the steps of:
   positioning a flexible sheet on a surface of a magnetic chuck, the surface of the magnetic chuck having a topography, such that a magnetic force of the magnetic chuck causes a first surface of the flexible sheet to be formed into a reverse topography of the topography of the magnetic chuck;
   securing a frame having greater rigidity than the flexible sheet relative to the flexible sheet as the first surface of the flexible sheet is formed into the reverse topography of the topography of the magnetic chuck by the magnetic force of the magnetic chuck; and
   removing the flexible sheet together with the frame secured thereto from the magnetic chuck,
   wherein the first surface of the flexible sheet retains the reverse topography of the topography of the magnetic chuck when the flexible sheet is removed from the magnetic chuck together with the frame secured thereto.

2. The method as set forth in claim 1, wherein the topography of the magnetic chuck includes a flat surface such that the reverse topography of the flexible sheet is a flat surface.

3. The method as set forth in claim 1, wherein the frame is secured to the flexible sheet with one or more fasteners.

4. The method as set forth in claim 1, wherein the frame is secured to the flexible sheet with an adhesive.

5. The method as set forth in claim 1, wherein the magnetic chuck is an electromagnetic chuck.

6. The method as set forth in claim 5, wherein the magnetic force of the magnetic chuck is turned on by applying power to the magnetic chuck to cause the first surface of the flexible sheet to be formed into the reverse topography of the topography of the magnetic chuck.

7. The method as set forth in claim 5, wherein the flexible sheet is removed together with the frame secured thereto from the magnetic chuck after turning off power to the magnetic chuck.

8. The method as set forth in claim 1, wherein the magnetic force applied by the magnetic chuck is greater than 500 psi.

9. A method of reinforcing a flexible sheet, comprising the steps of:
   positioning a flexible sheet on a surface of a magnetic chuck, the surface of the magnetic chuck having a topography, such that a magnetic force of the magnetic chuck causes a first surface of the flexible sheet to be formed into a reverse topography of the topography of the magnetic chuck;
   attaching ribs to the flexible sheet as it is formed into the reverse topography of the topography of the magnetic chuck;
   securing a frame relative to the flexible sheet by attaching the frame to the ribs as the first surface of the flexible sheet is formed into the reverse topography of the topography of the magnetic chuck; and
   removing the flexible sheet together with the frame secured thereto from the magnetic chuck,
   wherein the first surface of the flexible sheet retains the reverse topography of the topography of the magnetic chuck when the flexible sheet is removed from the magnetic chuck together with the frame secured thereto.

10. The method as set forth in claim 9, wherein the topography of the magnetic chuck includes a flat surface such that the reverse topography of first surface of the flexible sheet is a flat surface.

11. The method as set forth in claim 9, wherein the frame is secured to the ribs by an adhesive.

12. The method as set forth in claim 9, wherein the frame is secured to the ribs by one or more fasteners extending through holes in the ribs and the frame, the holes in at least one of the ribs and the frame being elongated.

13. A method of reinforcing a flexible sheet, comprising the steps of:
   loosely attaching a plurality of spacer elements to a first flexible sheet having a plurality of holes therein, all of the spacer elements being of the same size;
   loosely attaching a second flexible sheet to the plurality of spacer elements;
   positioning the first and second flexible sheets loosely attached to the plurality of spacer elements on a surface of a magnetic chuck such that an outer surface of the first flexible sheet is adjacent the surface of the magnetic chuck, the surface of the magnetic chuck having a topography, and such that a magnetic force of the magnetic chuck causes the outer surface of the first flexible sheet to be formed into a reverse topography of the topography of the magnetic chuck;

tightly attaching the plurality of spacer elements and the first and second flexible sheets to form a resulting assembly;

removing the resulting assembly from the magnetic chuck, wherein the outer surface of the first flexible sheet retains the reverse topography of the topography of the magnetic chuck when the tightened assembly is removed from the magnetic chuck.

14. The method as set forth in claim 13, wherein the topography of the magnetic chuck includes a flat surface such that the reverse topography of the outer surface of the first flexible sheet is a flat surface.

15. The method as set forth in claim 13, wherein the first flexible sheet is secured to at least some of the spacers by an adhesive.

16. The method as set forth in claim 13, wherein the first flexible sheet is secured to at least some of the spaces by one or more fasteners.

* * * * *